US010864392B2

(12) United States Patent
Thompson et al.

(10) Patent No.: US 10,864,392 B2
(45) Date of Patent: Dec. 15, 2020

(54) IN-MASK FEEDBACK SYSTEM (71) Applicant: Scott Technologies, Inc., St. Paul, MN (US)

(72) Inventors: Darin Kyle Thompson, Huntersville, NC (US); Eric James Bassani, Denver, NC (US); Graham Peter Wilson, Flintshire (GB); Troy Alan Baker, Denbighshire (GB); Kyle Dane Hudson, Denbighshire (GB); Christopher Ward, Denbighshire (GB); Longin James Kloc, Charlotte, NC (US); Kimberly Michelle Henry, Charlotte, NC (US)

(73) Assignee: Scott Technologies, Inc., Monroe, NC (US)

(*) Notice: Subject to any disclaimer, the term of this patent is extended or adjusted under 35 U.S.C. 154(b) by 81 days.

(21) Appl. No.: 15/766,105

(22) PCT Filed: Oct. 7, 2016

(86) PCT No.: PCT/US2016/055894
§ 371 (c)(1),
(2) Date: Apr. 5, 2018

(87) PCT Pub. No.: WO2017/062709
PCT Pub. Date: Apr. 13, 2017

(65) Prior Publication Data
US 2019/0118008 A1 Apr. 25, 2019

Related U.S. Application Data (60) Provisional application No. 62/238,562, filed on Oct. 7, 2015.

(51) Int. Cl.
*G02B 27/14* (2006.01)
*G09G 5/00* (2006.01)
(Continued)

(52) U.S. Cl.
CPC ............ *A62B 18/082* (2013.01); *A62B 9/006* (2013.01); *A62B 18/08* (2013.01);
(Continued)

(58) Field of Classification Search
CPC ....... A62B 18/082; A62B 9/006; A62B 18/08; A62B 18/02; G02B 27/0176; G02B 2027/0138
(Continued)

(56) References Cited

U.S. PATENT DOCUMENTS

| 7,038,639 | B1 | 5/2006 | Olstad |
| 2002/0053101 | A1 | 5/2002 | Slack |

(Continued)

FOREIGN PATENT DOCUMENTS

WO  WO 2011/115754  9/2011

OTHER PUBLICATIONS

Supplementary EP Search Report for EP 16 85 4385 (dated Jun. 5, 2019), 3 pages.
(Continued)

*Primary Examiner* — William Choi (57) ABSTRACT

Disclosed herein is an in-mask display or feedback system having a lens coupled to a face blank of the mask, the lens covering a facepiece. The feedback system includes a display apparatus coupled to the facepiece, and disposed within an interior of the mask, the display apparatus being powered by a first power source coupled to a housing of the display apparatus. The feedback system further includes a recording device (e.g., a camera) coupled to the face blank, the recording device operable to communicate data (e.g., wirelessly or wired) with the display apparatus. In some approaches, the recording device is powered by a second power source. In other approaches, the first power source provides power to both the recording device and the display
(Continued)

apparatus. In another approach, the display apparatus includes an adjustment aperture formed therethrough to allow adjustment of an eye piece housing a display.

18 Claims, 11 Drawing Sheets

(51) Int. Cl.
*A62B 18/08* (2006.01)
*A62B 9/00* (2006.01)
*G02B 27/01* (2006.01)
*A62B 18/02* (2006.01)

(52) U.S. Cl.
CPC .......... *G02B 27/0176* (2013.01); *A62B 18/02* (2013.01); *G02B 2027/0138* (2013.01)

(58) Field of Classification Search
USPC ............ 359/630; 345/8; 128/201.12, 201.23, 128/201.24
See application file for complete search history.

(56) References Cited

U.S. PATENT DOCUMENTS

| | | |
|---|---|---|
| 2003/0002164 A1 | 1/2003 | McDonald |
| 2003/0058544 A1 | 3/2003 | Bianco |
| 2005/0167590 A1 | 8/2005 | Miyano |
| 2007/0181129 A1 | 8/2007 | Mattinson |
| 2008/0023002 A1 | 1/2008 | Guelzow |
| 2013/0112195 A1 | 5/2013 | Smith |
| 2015/0273248 A1 | 10/2015 | Kuutti |

OTHER PUBLICATIONS

International Search Report for PCT/US2016/055894, dated Dec. 23, 2016 (3 pages).

IN-MASK FEEDBACK SYSTEM

CROSS REFERENCE TO RELATED APPLICATIONS

This application is a national stage filing under 35 U.S.C. 371 of PCT/US2016/055894, filed Oct. 7, 2016, which claims the benefit of U.S. Provisional Patent Application No. 62/238,562, filed Oct. 7, 2015, the disclosures of which are incorporated by reference in their entirety herein.

FIELD OF THE DISCLOSURE

The disclosure generally relates to personal safety equipment, and more particularly, to masks including in-mask display systems with thermal imaging capabilities.

BACKGROUND OF THE DISCLOSURE

A supplied-air respirator such as self-contained breathing apparatus (SCBA) permits a person to breath in hazardous environments such as fires and confined spaces where breathing would be difficult or impossible without mechanical aid. A supplied-air respirator may, for example, include a full facepiece, a harness and carrier assembly, a gas cylinder containing high pressure compressed air (or other oxygen containing gas) for breathing and at least one, and more typically two, pressure regulators. The first or first-stage regulator is typically mounted near the air cylinder and functions to reduce the relatively high pressure of the compressed air from the air cylinder to above atmospheric pressure.

An air purifying respirator (APR) may be mounted to a helmet or suit to provide filtered air to a breathing mask for breathing and to the suit for ventilation. These devices reduce the inhalation resistance created by the filters, and increase the level of protection by creating positive pressure in the facepiece.

A powered air purifying respirator (PAPR) continually supplies positive air pressure to a respirator to maintain positive pressure in the respirator. PAPRs are generally used in military, industrial, and/or hazardous environments to provide personal respiratory protection by preventing ambient air from entering the user's mask, helmet, or hood. Respiratory hazards might include particulate matter, harmful gases, or vapors, which are removed by passing the ambient air through the filter. Typically, a powered air-purifying respirator includes a powered fan that forces ambient air through one or more filters for delivery to an inlet opening in the respirator. The fan and filter may be mounted on a facemask, or in some cases, may be mounted on a belt or backpack and connected to the facemask through a hose and a fan. Power for the fans are typically mounted remote from the facemask but can also be mounted on the mask itself.

The facemask or facepiece, which is typically sealed to the face of the user, may include a lens through which the user can view the surrounding environment. The facepiece also includes an interface or mount for fluid connection with a second-stage regulator through which inspired air passes into the face mask, and an exhalation port through with expired air passes out of the mask. In some facepieces, a single port is used for both inspired and expired air. In other facepieces, separate ports are used. The user's respiration controls a valve system, which may include an inhalation valve and an exhalation valve, to control delivery of pressurized air via the second-stage regulator. Often, it is desirable to maintain a slight positive pressure within the facepiece relative to ambient pressure. Facepieces for supplied-air respirators in which a positive pressure is maintained within the facepiece are often referred to as pressure demand facepieces, while other facepieces for supplied-air respirators are often referred to as demand facepieces.

The facepiece (also referred to as headtop), which is typically sealed to the face or neck of the user, may include a lens through which the user can view the surrounding environment. The facepiece or headtop also includes an interface or mount for fluid connection of a filter or hose which inspired air passes into the face mask or headtop and an exhalation port through with expired air passes out of the mask. In some facepieces, a single port is used for both inspired and expired air. In other facepieces or headtops, separate ports are used. The user's respiration controls a valve system (for example, including an inhalation valve and an exhalation valve) to control delivery of pressurized or negative pressure air.

It is often desirable to provide information to the user of a breathing apparatus, including, for example, data on the status of the air supply, power supply and/or other systems of the breathing apparatus, information on other users in the vicinity of the user, evacuation alerts and/or other information. Informational displays have been provided to users of a breathing apparatus in a number of manners. In one example, a display may be provided in the vicinity of the second stage regulator. In another example, a display may alternatively be provided on an outer portion of the lens. In the case of displays exterior to a facepiece of a breathing apparatus, smoke or other environmental conditions could obscure the user's vision of the display unless it is located very close to the lens of the facepiece. Moreover, harsh environmental conditions can adversely affect the operation of the display. Also, care must be taken in the case of positioning a display in the vicinity of the facepiece so as to not to overly obstruct the field of view of the user.

Providing a display within the interior of the facepiece can eliminate one or more of the adverse effects of the surrounding environment on the display, but can present other problems with, for example, the weight of the facepiece, the center of gravity of the facepiece, the field of view of the user, the cost of the facepiece and/or other aspects of the facepiece.

SUMMARY OF THE DISCLOSURE

In view of the foregoing, an apparatus according to one approach of the disclosure includes a facepiece disposed within an interior of a mask, and a lens coupled to a face blank, the lens covering the facepiece. The apparatus further includes a feedback system disposed between the lens and the facepiece, wherein the feedback system includes a display apparatus coupled to the facepiece, and a power source coupled to the display apparatus, wherein the power source electrically connected to the display apparatus for supplying power to the display apparatus. The feedback system further includes a recording device coupled to the face blank, external to the lens, the recording device operable to communicate data with the display apparatus.

An in-mask feedback system according to another approach of the disclosure includes a facepiece disposed within an interior of the mask, a lens coupled to a face blank, wherein the lens covers the facepiece, and a feedback system disposed between the lens and the facepiece. The feedback system may include a display apparatus coupled to the facepiece, wherein the display apparatus includes a first data communication system, and a power source coupled to the display apparatus, wherein the power source is electrically connected to the display apparatus for supplying power to the display apparatus. The feedback system may further include a feedback device coupled to the face blank, external to the lens, the feedback device including a camera and a second communication system operable to wirelessly communicate data to the display apparatus.

A mask according to another approach of the disclosure may include a facepiece configured to engage a face of a user, a face blank extending around the facepiece, and a lens coupled to the face blank, wherein the lens extending over the facepiece. The mask further includes an in-mask feedback system disposed between the lens and the facepiece. The in-mask feedback system includes a display apparatus coupled to the facepiece, wherein the display apparatus including a first data communication system, and a power source coupled to the display apparatus, wherein the power source is electrically connected to the display apparatus for supplying power to the display apparatus. The power source may be disposed between a distal end of the lens and the facepiece. The in-mask feedback system further includes a feedback device coupled to the face blank, external to the lens, wherein the feedback device including a camera and a second communication system operable to wirelessly communicate data to the display apparatus.

BRIEF DESCRIPTION OF THE DRAWINGS

By way of example, embodiments of the disclosure will now be described, with reference to the accompanying drawings, in which.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

DETAILED DESCRIPTION

An improved mask in accordance with the present disclosure will now be described more fully hereinafter with reference to the accompanying drawings, where embodiments of the system and method are shown. The system may be embodied in many different forms and are not be construed as being limited to the embodiments set forth herein. Instead, these embodiments are provided so this disclosure will be thorough and complete, and will fully convey the scope of the system and method to those skilled in the art.

For the sake of convenience and clarity, terms such as "top," "bottom," "upper," "lower," "vertical," "horizontal," "lateral," and "longitudinal" will be used herein to describe the relative placement and orientation of these components and their constituent parts, with respect to the geometry and orientation of a component of a semiconductor manufacturing device as appearing in the figures. The terminology will include the words specifically mentioned, derivatives thereof, and words of similar import.

As used herein, an element or operation recited in the singular and proceeded with the word "a" or "an" are understood as potentially including plural elements or operations as well. Furthermore, references to "one embodiment" of the present disclosure are not intended to be interpreted as precluding the existence of additional embodiments also incorporating the recited features.

Figure 1A:
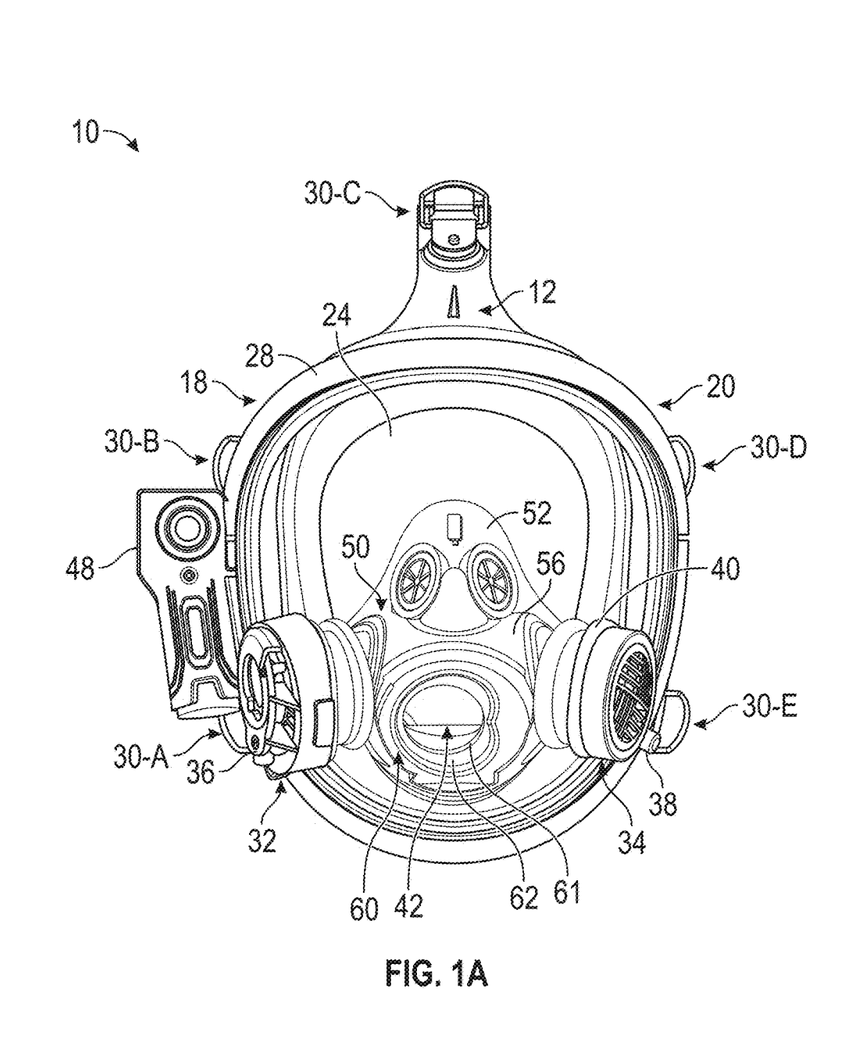
FIGS. 1A-B depict views of an exemplary mask including an in-mask display system according to aspects of the disclosure.
Figure 1B:
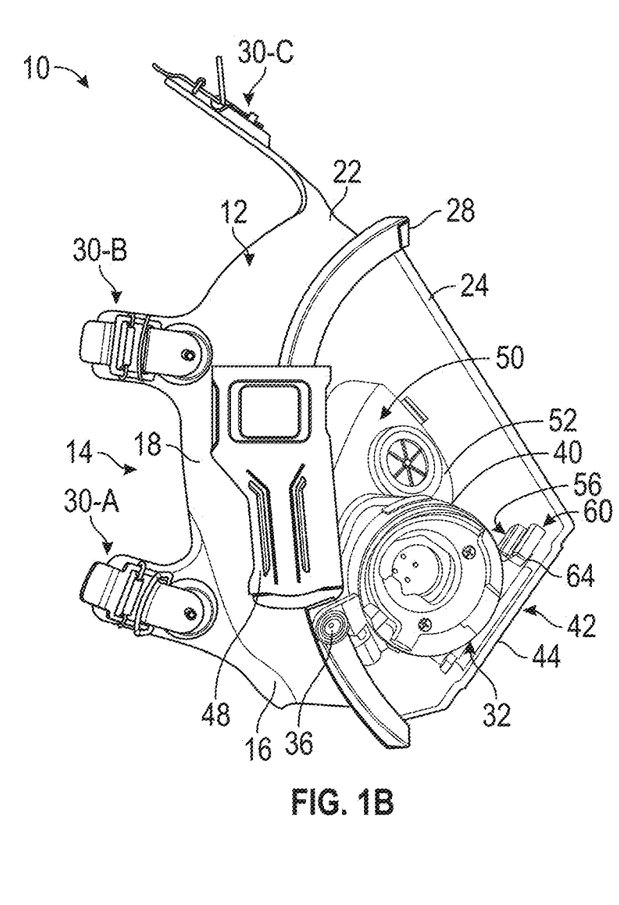

Referring now to FIGS. 1A-B, an exemplary mask including facepiece (alternatively termed facemask or headtop) mounted feedback and respiration systems will be described in greater detail. As may be used herein, terms such as "front", "forward", "rear", rearward", "up", "down" or like terms refer to reference directions associated with a person wearing the mask 10 as shown in FIGS. 1A-B, and standing generally upright.

As shown, a mask 10 includes a face blank 12, which may be fabricated, for example, from a silicon rubber, and includes a rear opening 14 which seals around the face of a user. In general, the face blank 12 includes a chin section 16 that seals around the chin area of the user, side sections 18, 20 that seal around respective sides of the user's face and a forehead section 22, opposite chin section 16, which seals around the forehead of the user. The face blank 12 is attached to a lens 24 by a sealing member 28 that extends along a peripheral rim or edge of the face blank 12. The face blank 12 includes a plurality of fasteners 30A-E (e.g., clasps or buckles) for attaching the face blank to a headnet (not shown) worn by the user. The mask 10 may further include a recording or feedback device, such as an A/V camera 48, coupled to either side section 18 or 20 of the face blank 12, the structure and operation of which will be described in greater detail below.

The mask 10 may further include first and second respiration and/or filtering components 32, 34 formed through a set of corresponding openings in a lower section of the lens 24. In one embodiment, the first and second respiration and/or filtering components 32, 34 are coupled to the sealing member 28 at first and second connections 36, 38. As shown, first and second connections 36, 38 may each include sealing rings 40, extending around a circumference thereof, and disposed on opposite sides of the lens 24 to form a sealed engagement, fit, or connection with the lens 24.

As shown, the lens 24 includes a generally central opening 42 disposed through a lower section thereof. The central opening 42 is formed in a forward end wall 44 of the lens 24, the forward end wall 44 extending away from the chin section 16. In exemplary embodiments, the lens 24 may, for example, be injection molded from a polymeric material, such as a transparent polycarbonate.

Referring now to FIGS. 1A-2B, a facepiece will be described in greater detail. As shown, the mask 10 further includes a facepiece 50 disposed between the lens 24 and the face blank 12, the facepiece 50 is generally configured to cover the mouth and nose of the wearer. The facepiece 50 includes a main body 52 and a front portion 56, which extends from the main body 52 towards the central opening 42 of the lens 24. The main body 52 of the facepiece 50 has a plurality of openings 58A-D and 61 formed therein, wherein the openings 58-A, 58-D and 61 are configured to receive respective first and second respiration and/or filtering components 32, 34 and/or emit speech from the user.

Figure 2A:
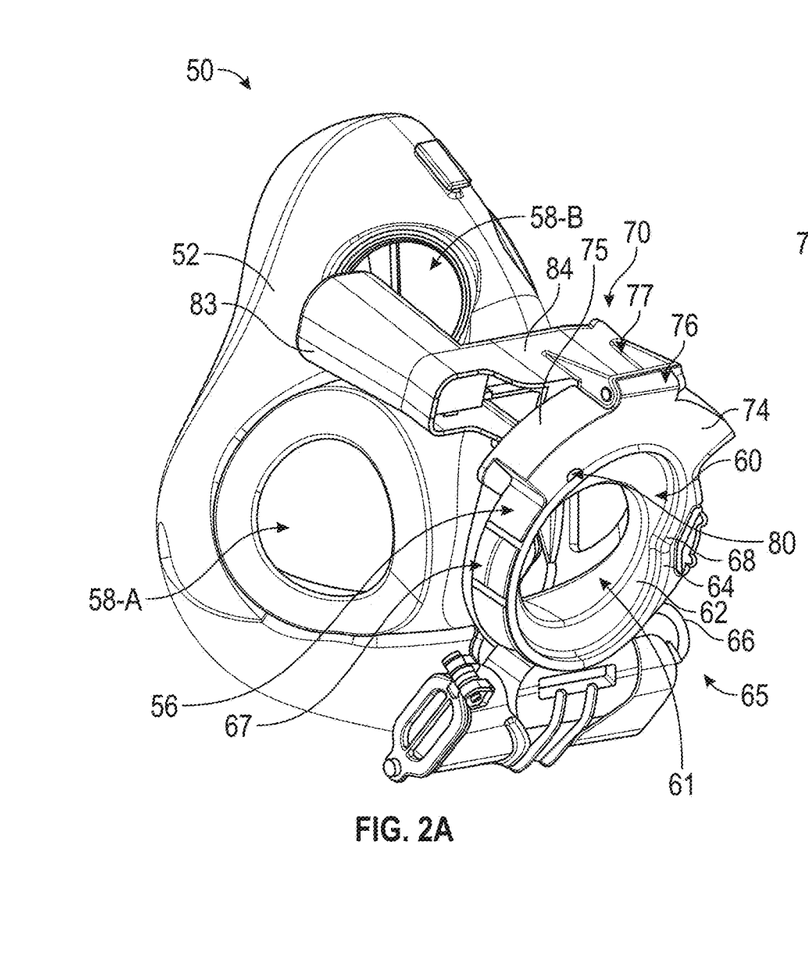
FIGS. 2A-B depict views of a facepiece and display apparatus of the exemplary mask of FIGS. 1A-B according to aspects of the disclosure.
Figure 2B:
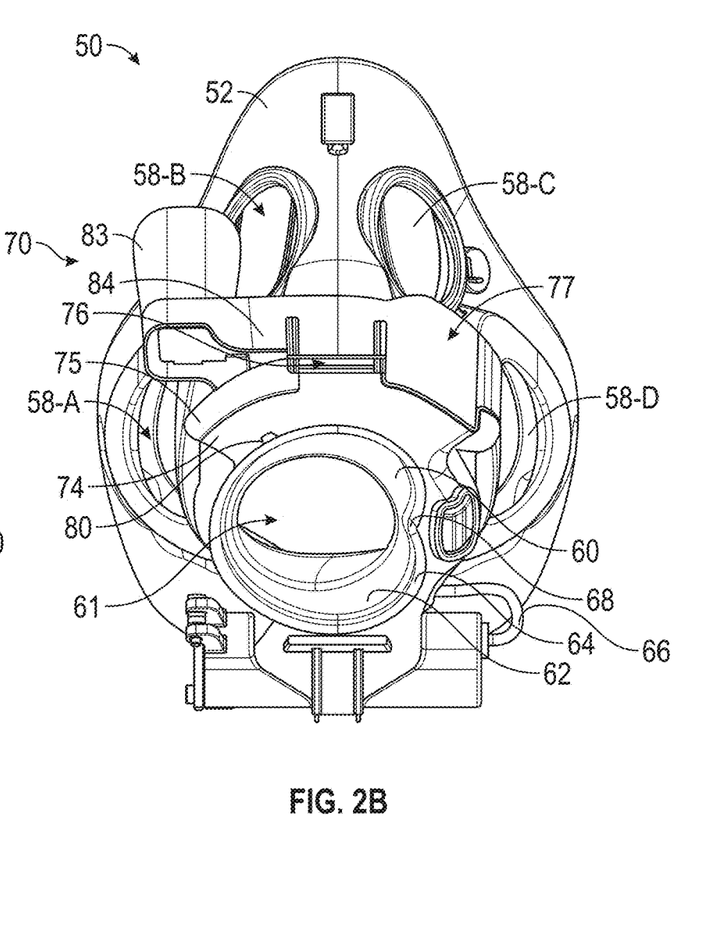

As shown, the front portion 56 of the facepiece 50 includes a retaining flange 60 disposed at a distal end thereof. The retaining flange 60 has the opening 61 formed therein, which is generally aligned with the central opening 42 of the lens 24. The retaining flange 60 further includes an interior shelf 62 surrounding the opening 61 and extending generally perpendicularly from the front portion 56. A rim 64 extends from the interior shelf 62.

In exemplary embodiments, the facepiece 50 is coupled to a pressure regulator (not shown) or filtered air including negative and positive pressure air, which delivers breathing gas to the user on demand through the opening 61 of the front portion 56. The pressure regulator may include a housing within which a diaphragm is disposed, the diaphragm dividing the regulator into an inner chamber in fluid connection with an interior of the facepiece 50 and an outer chamber in fluid connection with the surrounding environment, which is typically at ambient pressure. The diaphragm is coupled to an actuating mechanism which opens and closes an inlet valve. The user's respiration creates a pressure differential between inner and outer chambers which, in turn, causes displacement of the diaphragm thereby controlling (e.g., opening and closing) the inlet valve. As a result, the regulator may be a pressure demand regulator or positive or negative pressure valve system.

In one non-limiting embodiment, the retaining flange 60 has a limacon shape. As such, the pressure regulator and/or breathing source and its associated interface may be "keyed" by the irregular shape of the interior shelf 62 and the rim 64 of the retaining flange 60. As shown, the limacon shape and the presence of a point 68 of the rim 64 provide an asymmetry to the retaining flange 60, which ensures that the pressure regulator may be attached to the interface port of the front portion 56 of the facepiece 50 in only one orientation.

Figure 3A:
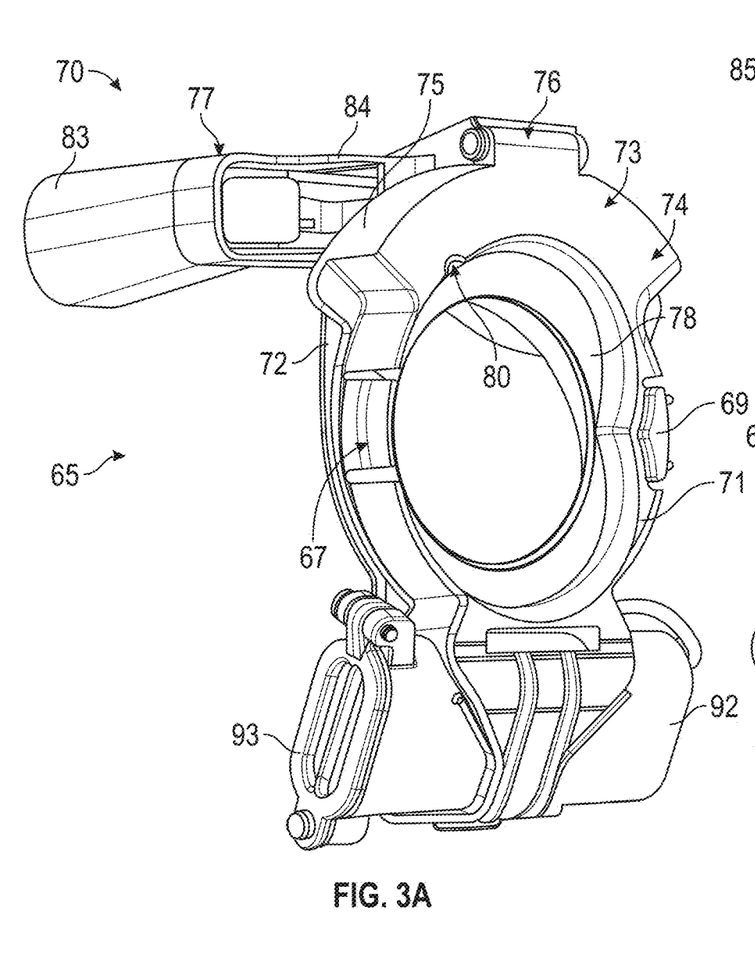
FIGS. 3A-B depict views of the display apparatus of the exemplary mask of FIGS. 1A-B according to aspects of the disclosure.
Figure 3B:
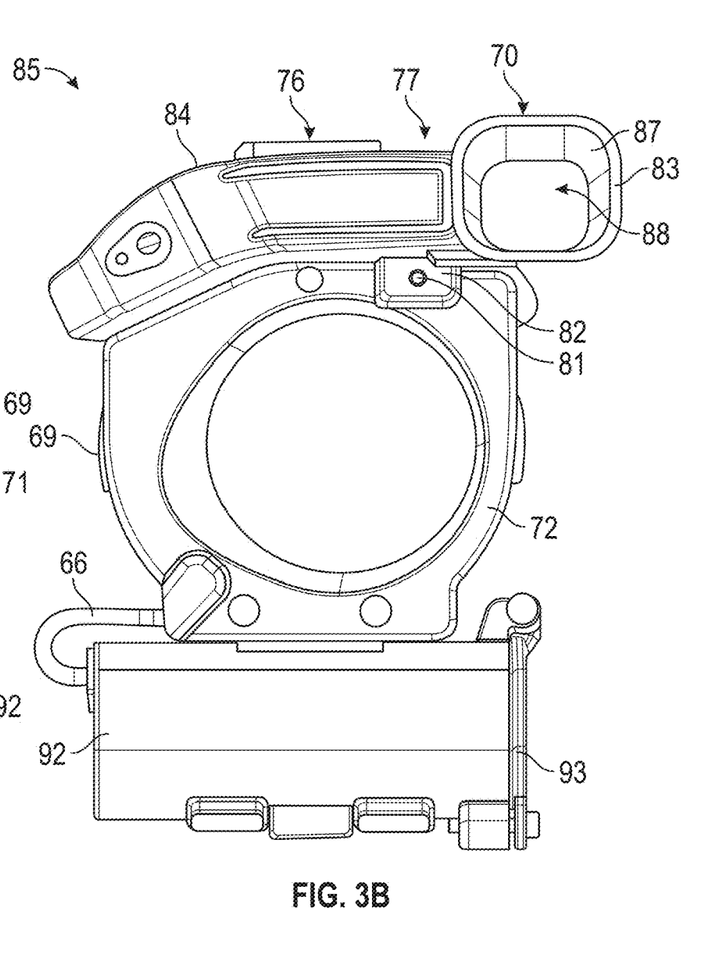
Figure 4:
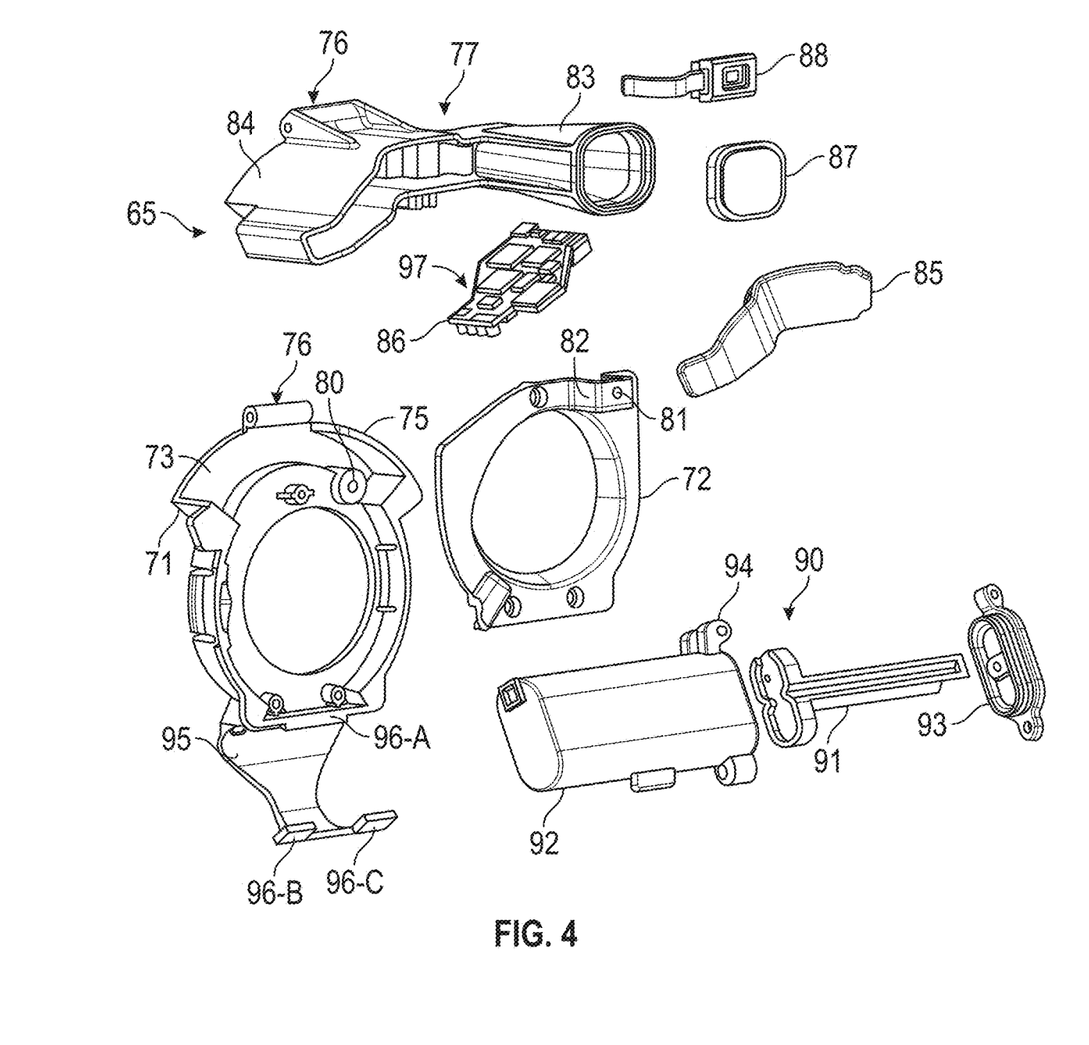
FIG. 4 depicts an exploded view of the display apparatus of the exemplary mask of FIGS. 1A-B according to aspects of the disclosure.

Referring now to FIGS. 2-4, a feedback system of the mask 10 will be described in greater detail. As shown, a feedback system 65 includes a display apparatus 70 coupled to the front portion 56 of the facepiece 50, the display apparatus 70 in communication with the camera 48 (FIG. 1), for example, through a wired or wireless connection, as will be described in further detail below. The display apparatus 70 may include a chassis 71 and chassis cover 72 configured to receive the front portion 56 through respective openings formed therein. In one embodiment, the chassis 71 may be coupled to the chassis cover 72 via a set of screws. As shown, the chassis 71 includes an arcuate flange 73 having a front face 74 and a top surface 75, the front face 74 generally disposed adjacent the lens 24 (FIGS. 1-2). The chassis 71 further includes a hinge 76 coupled to the arcuate flange 73 for rotatably coupling the chassis to an eye piece 77.

As best shown in FIG. 3A, the chassis 71 may include a recessed portion 78 sized to receive the flange 60 of the front portion 56. In particular, the interior shelf 62 of the retaining flange 60 is seated within the recessed portion 78, while the rim 64 of the flange 60 may protrude through the opening of the chassis 71, as shown. The chassis 71 further includes a set of fasteners (e.g., clasps) 67, 69 for releasably securing the display apparatus 70 to the lens 24.

The chassis 71 further includes an adjustment aperture 80 formed therethrough. The adjustment aperture 80 extends through the chassis 71 and is generally aligned with a corresponding opening 81 through a bracket 82 of the chassis cover 72. The adjustment aperture 80 and opening 81 provide an inlet for a tool (not shown) to be inserted therein to adjust the position of the eye piece 77. For example, the tool (e.g., a pin or rod) may engage the eye piece 77 to rotate the eye piece 77 about an axis formed by a pin of the hinge 76. This may allow the user to manually and externally adjust a position of the eye piece 77 without having to remove the mask 10.

As further shown, the eye piece 77 includes a cylinder or chamber 83 extending from an electronics cover 84, and a removable lid 85 configured to house a printed circuit board (PCB) 86 therein. The PCB 86 operates with an optic 87 and a display 88 (e.g., a micro display), which are disposed within the cylinder 83 to provide visual imagery and feedback to the user. The display 88, as used herein, includes, but is not limited to, one or more light emitting diodes (LEDs), liquid crystal displays (LCDs), incandescent lamps, and/or others types of visual indicators, either individually or in any combination.

In one embodiment, the PCB 86 includes a first data communication system 97, as will be described in greater detail below. The eye piece 77 may be powered by a power source 90, such as one or more batteries held by a battery container 91 disposed within a battery chamber 92. The battery chamber 92 may include a battery hatch 93 pivotably secured by a hinge 94 at one end thereof. As shown, the power source 90 is secured within a battery holder 95, which is configured to provide a snap-fit engagement with the battery chamber 92 via a plurality of tabs 96A-C. The power source 90 may supply power to the display apparatus 70 via insulated wiring 66, which extends into the chassis cover 72. In exemplary embodiments, the power source 90 is disposed within an interior of the mask 10, i.e., between the facepiece 50 and the lens 24, in an area proximate the chin section 16 (FIGS. 1A-B).

Turning now to FIGS. 1A-B, 5A-B, and 6, the camera 48 of the feedback system will be described in greater detail. In exemplary embodiments, the camera 48 is a thermal imaging camera coupled to an exterior of the face blank 12 and the lens 24 with or without a mounting bracket 98. It will be appreciated that in other embodiments, the camera 48 may not be directly coupled to the face blank 12 and/or the lens 24. Instead, the camera 48 may be positioned external to the lens 24 and the facepiece 50, for example, atop a helmet, or attached to a chest harness or belt worn by the user. Embodiments herein are not limited to one particular camera location or camera type.

Figure 5A:
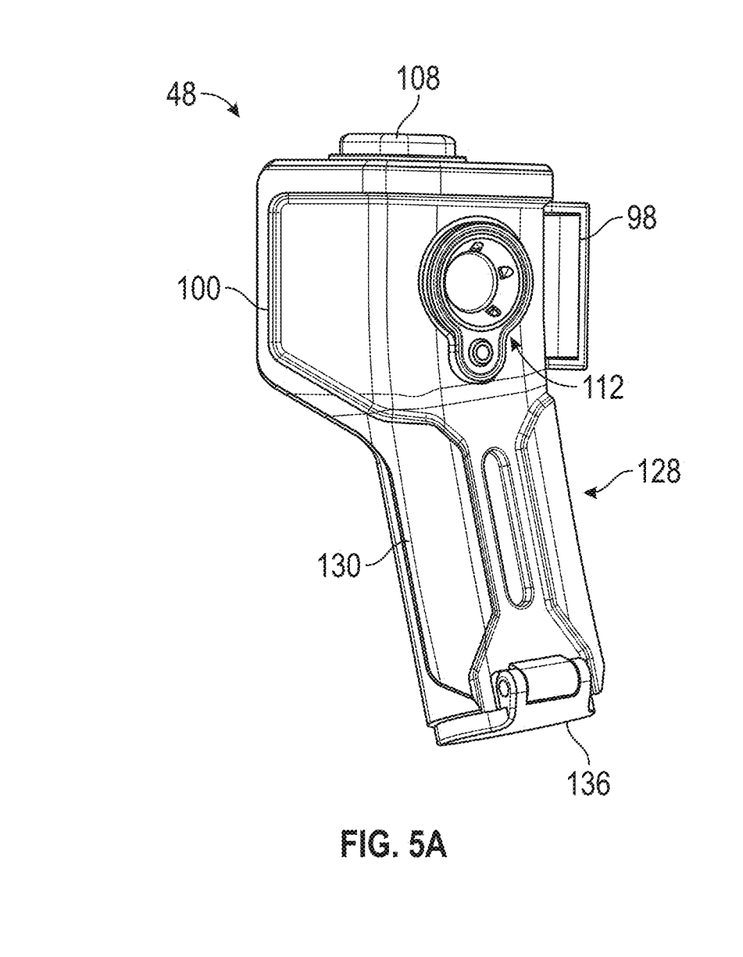
FIGS. 5A-B depict views of camera of the exemplary mask of FIGS. 1A-B according to aspects of the disclosure.
Figure 5B:
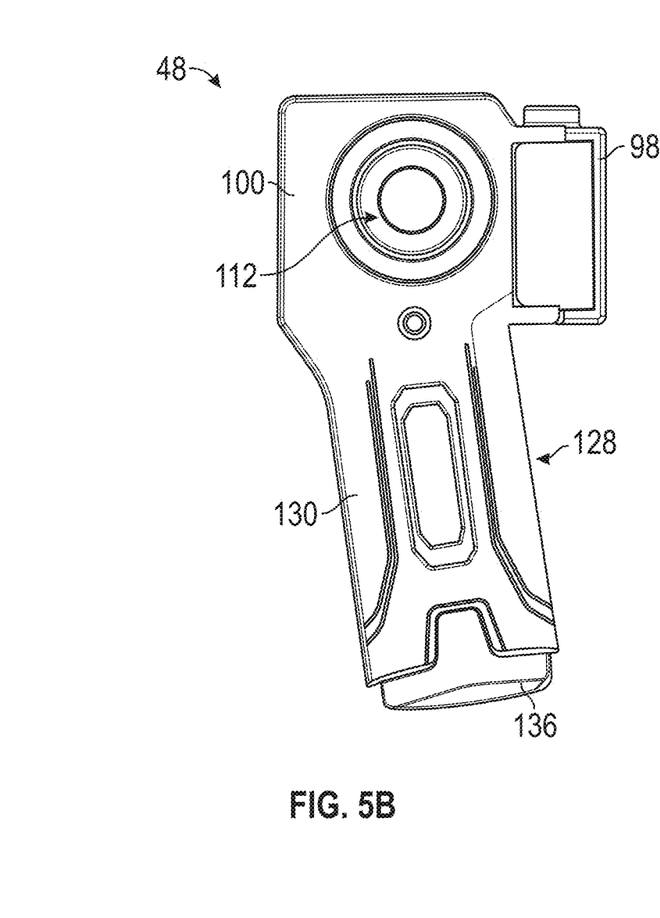
Figure 6:
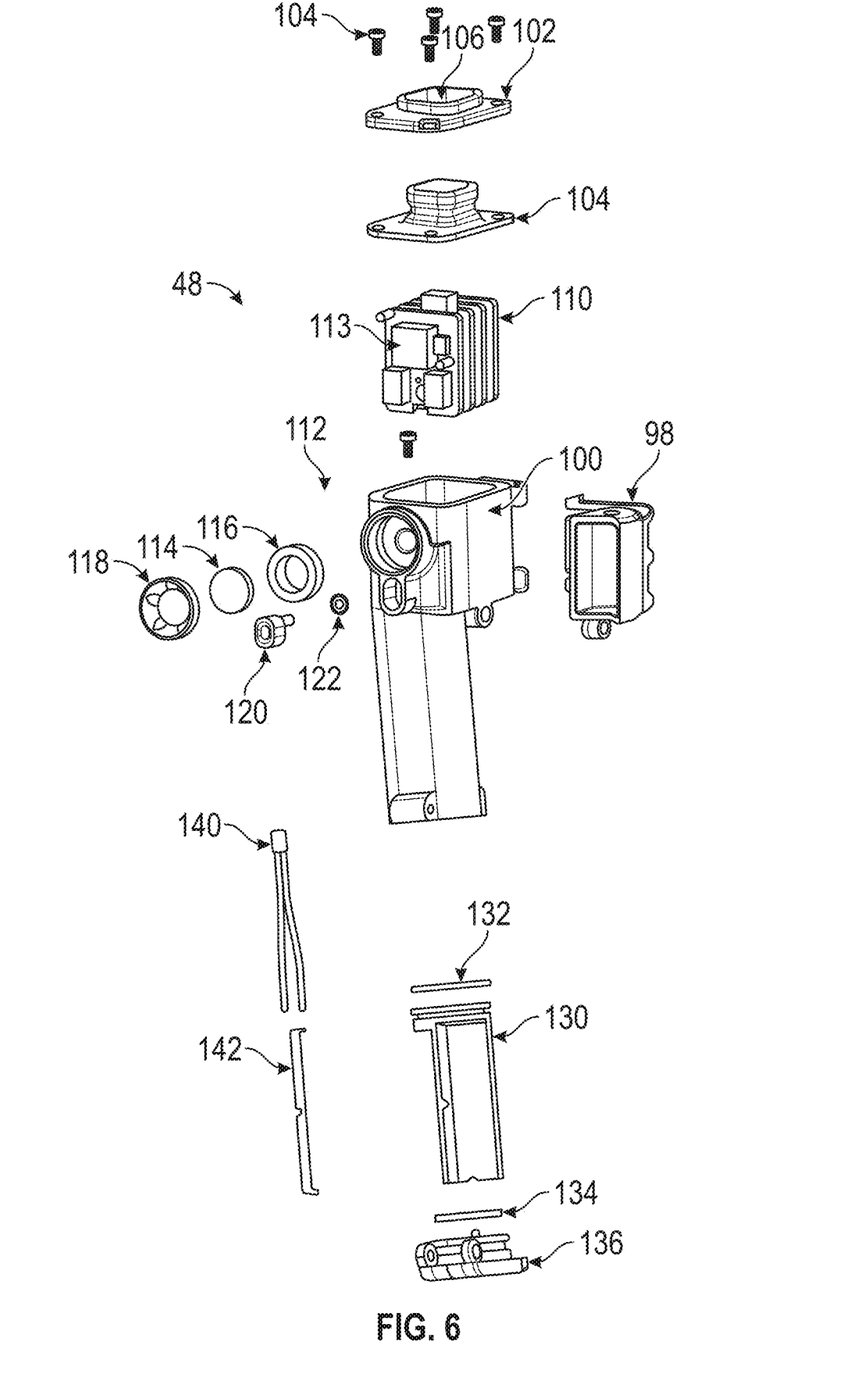
FIG. 6 depicts an exploded view of the camera of FIGS. 5A-B according to aspects of the disclosure.

The camera 48 may be gimbaled and zoom-able via electronic controls, and can also contain a combination of a zoom-able camera as well as a fish eye lens camera, or be a catadioptric mirror camera or other suitable camera system such as infrared or ultraviolet or any combination. It will be appreciated that multiple cameras and/or microphones may be used as part of a heads up display (HUD) or in mask display (IMD). Furthermore, other camera types may be used, and the disclosure is not limited to the geometry or camera type. For instance, a single omnidirectional mirror lens camera may be used in place of multiple cameras. The cameras are not limited to be just visible cameras, they may be infrared, ultra-violet, or other, or any combination. Furthermore, data from multiple cameras and camera types may be combined and/or aligned and/or overlaid to enhance the understanding and utility of the data.

As best shown in FIG. 6, the camera 48 further includes a lid 102 secured to the main housing 100 by a set of fastening elements 104 (e.g., screws). In one embodiment, the lid 102 includes an opening 106 formed therein for receiving a power button 108. The power button 108 may be depressed by the user to actuate a switch or contact of a PCB stack 110 disposed within the main housing 100. The camera 48 further includes a lens assembly 112, which may include a lens 114, a lens gasket 116, a lens retainer 118, a light source 120 (e.g., a light pipe), and a light source o-ring 122.

Figure 7A:
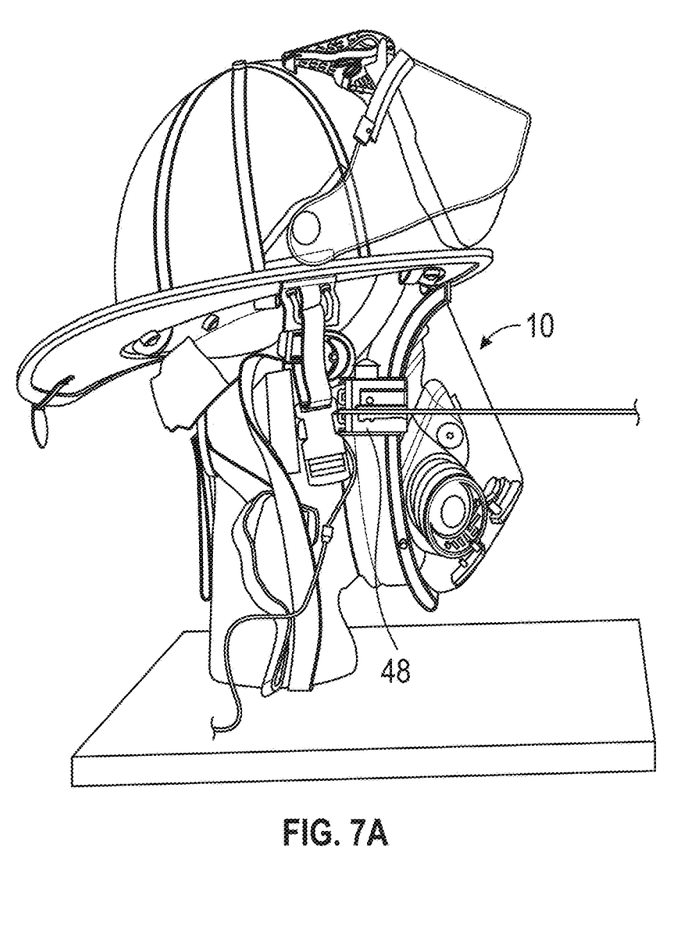
FIGS. 7A-B depict multiple possible camera angles of the camera of the in-mask display system of FIG. 1-B.
Figure 7B:
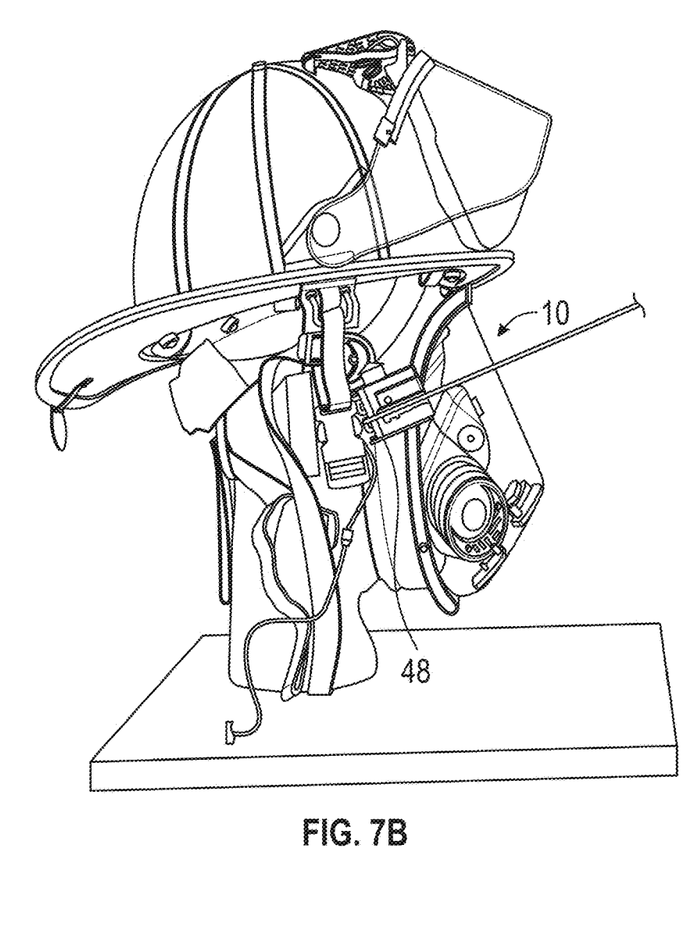

In exemplary embodiments, the camera 48 includes an internal power source 128, e.g., one or more batteries (not shown) housed within a battery carrier 130, for powering the PCB stack 110 and the lens assembly 112. The battery carrier 130 includes battery hatch o-rings 132, 134 and a battery hatch 136 disposed at a bottom end thereof. The camera 48 further includes power cables 140 and a voltage bridge 142 for electrically connecting the batteries and the PCB stack 110/lens assembly 112. The camera 48 may also be adjustable relative to a generally horizontal viewing plane of the mask 10, for example, as demonstrated by the different camera angles of FIGS. 7A-B.

Figure 8:
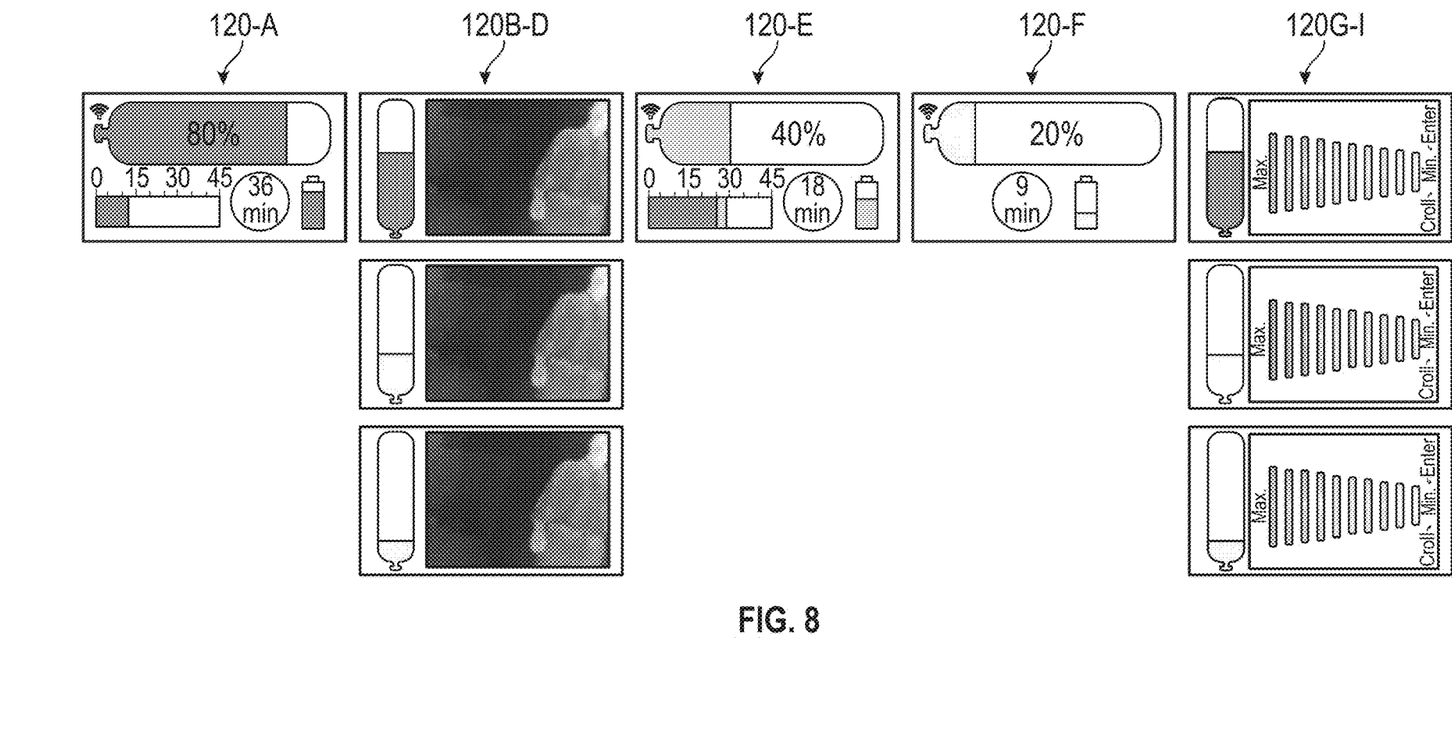
FIG. 8 depicts multiple possible mask display system scenarios to be viewed by the user.

In exemplary embodiments, the camera 48 is configured to communicate wirelessly (WiFi, Bluetooth, Infrared-IR, or other suitable wireless technology) with the display 88 (FIG. 4). For example, the PCB stack 110 may include a second data communication system 113 operable with the first data communication system 97 of the PCB 86 of the eye piece 77. In one embodiment, the first data communication system 97 may receive data from various components including, but not limited to, a pressure transducer in fluid connection with breathing gas tank (not shown), a PASS device, the power source 90, a telemetry system in communicative connection with the user and/or any communication system in a wired or wireless manner as known in the communication arts or information from a fixed or portable gas detection device. The first data communication system 97 communicates the data received from the components, and generates a visual output that is displayed to the user via the display 88, non-limiting examples of which are demonstrated by exemplary display outputs 120A-I of FIG. 8. In one non-limiting embodiment, as demonstrated by display outputs 120B-D, images captured from the camera 48 may be overlaid with information such as an amount of oxygen remaining in an oxygen source coupled to the mask 10. In other embodiments, such information may include: 1) battery power levels; 2) the time of use by the user of the mask; 3) present location information; 4) information about other people in a certain area; 5) map information; 6) temperature information; and/or the like.

In an exemplary embodiment, thermal imaging visual data received via the camera 48 is processed by the second data communication system 113 and wirelessly transmitted to the first data communication system 97. The camera 48 may include or integrate an ultrasonic transceiver to provide additional computer generated imaging that may be transmitted to the first data communication system 97 and displayed as an ultrasonic image. The camera 48 may capture environmental information such as IR, visible or low light images, ultrasonic images of the environment encountered by the user and send to the first data communication system 97 either in compressed or uncompressed form.

Turning now to FIGS. 9A-11, an exemplary mask including facepiece mounted feedback and respiration systems according to another embodiment will be described in greater detail. As shown, a mask 210 includes a face blank 212, which may be fabricated, for example, from a silicon rubber, that includes a rear opening 214, which seals around the face of a user. In general, the face blank 212 includes a chin section 216 that seals around the chin area of the user, side sections 218, 220 that seal around respective sides of the user's face, and a forehead section 222, opposite chin section 216 that seals around the forehead of the user. The face blank 212 is attached to a lens 224 by a sealing member 228 that extends along a peripheral rim or edge of the face blank 212. The face blank 212 includes a plurality of fasteners 230A-N (e.g., clasps or buckles) for attaching the face blank 212 to a head net 223 (FIG. 11) worn by the user. The mask 210 may further include a camera 248 coupled to the side section 218, the structure and operation of which will be described in greater detail below.

Figure 9A:
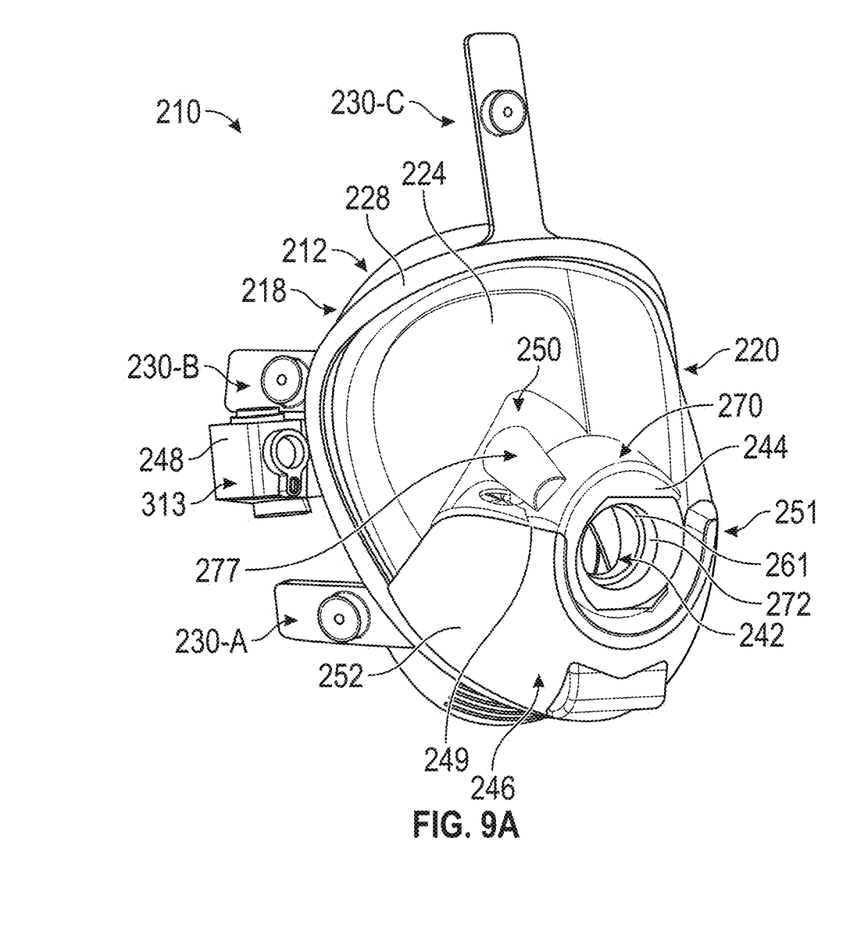
FIGS. 9A-C depict views of another exemplary mask including an in-mask display system according to aspects of the disclosure.
Figure 9B:
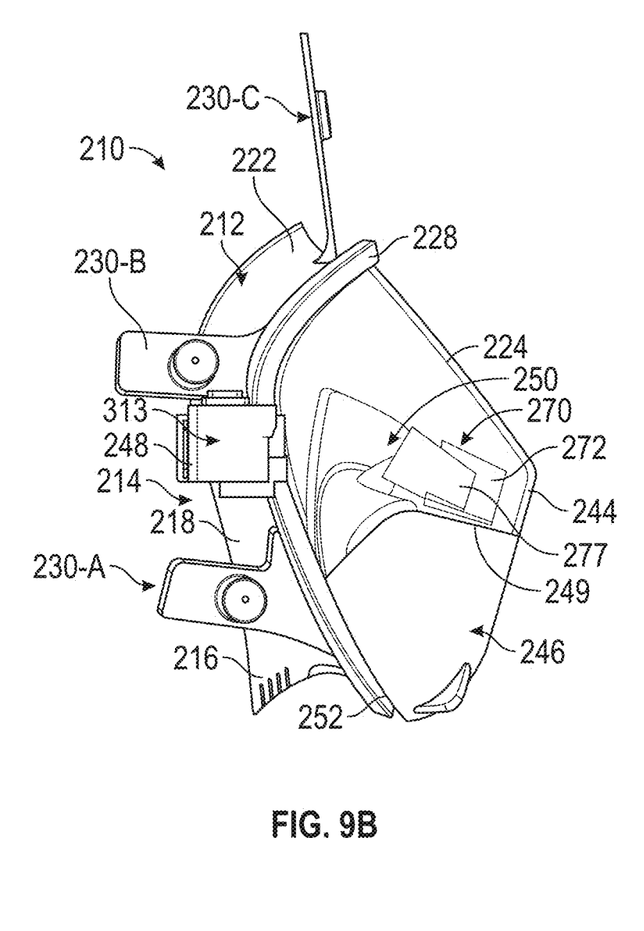
Figure 9C:
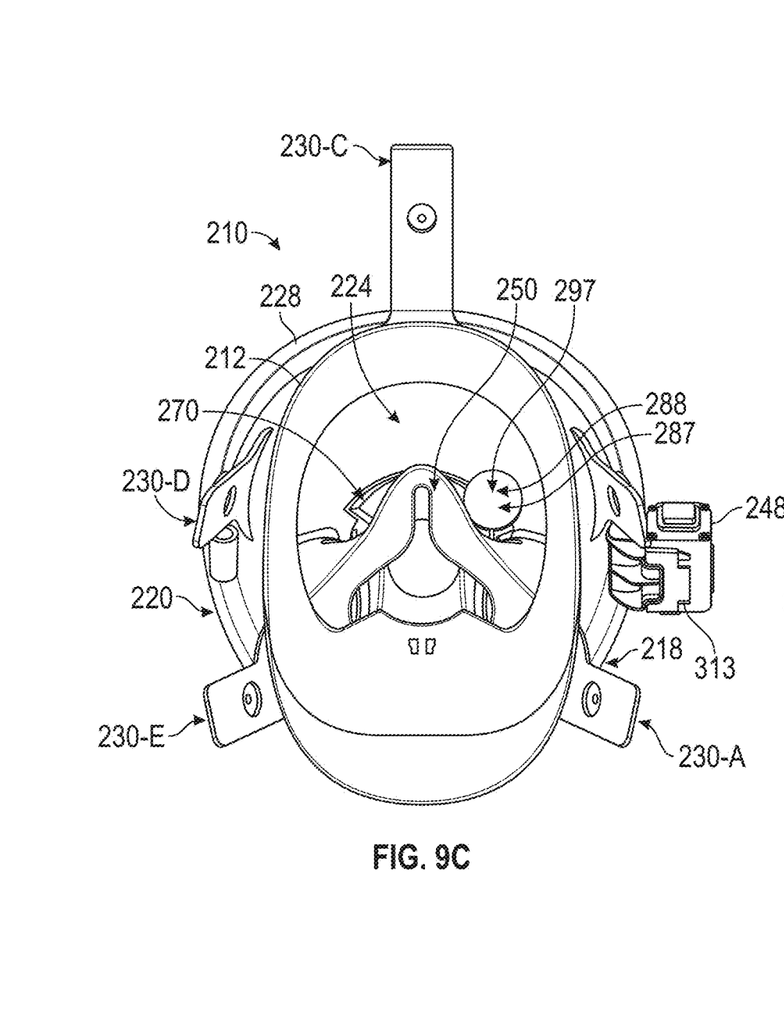
Figure 10:
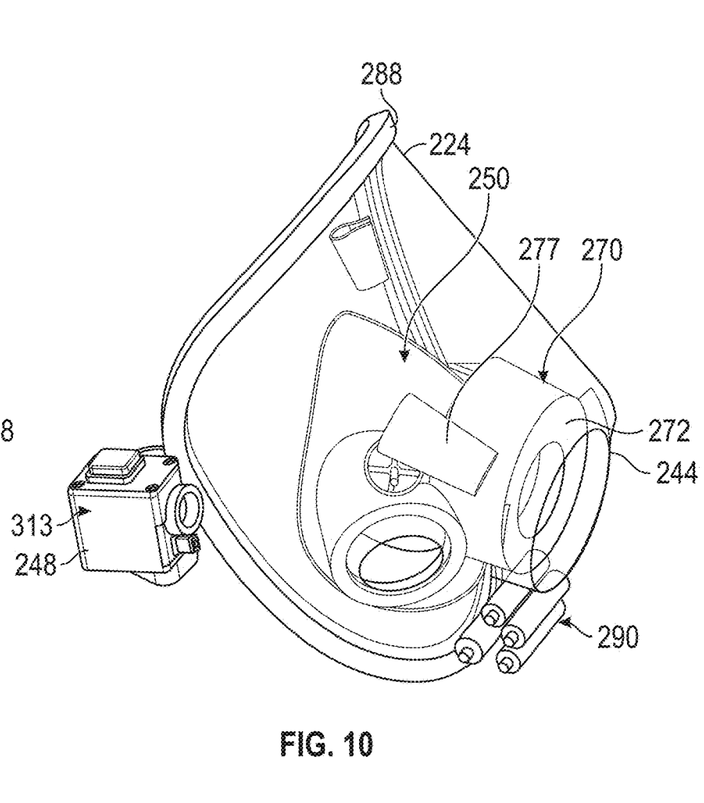
FIG. 10 depicts a facepiece and display apparatus of the exemplary mask of FIGS. 9A-C according to aspects of the disclosure.

The mask 210 is configured to receive a set of respiration and/or filtering components (not shown) formed through openings in a lower section of the lens 224. In one embodiment, the set of respiration and/or filtering components is coupled to the sealing member 228. For example, the mask 210 may receive a powered or unpowered air purifying respirator (PAPR).

As shown, the lens 224 includes a generally central opening 242 disposed therein. The central opening 242 may be formed in a forward end wall 244 of the lens 224. Below the opening is an integrated bottom section 246 formed around a lower portion of the lens 224. The bottom section 246 generally conforms to the shape of the lens 224, including the forward end wall 244, although this configuration is not intended as limiting. As shown, the bottom section 246 includes an upper edge 249, which is generally planar with, and extends from, a distal end 251 of the lens 224. An outer edge 252 of the bottom section 246 may be coupled to the sealing member 228. The bottom section 246 may further include a semicircular opening 254, which is generally aligned with the central opening 242 of the lens and the opening 261 of the facepiece 250. The bottom section 246 may further include one or more respiration and/or filtering components 232 formed through a set of corresponding openings 234.

The mask 210 further includes a facepiece 250 disposed between the lens 224 and the face blank 212, the facepiece 250 generally configured to cover the mouth and nose of the user. In exemplary embodiments, the facepiece 250 is coupled to a pressure regulator or filtration system (not shown), which delivers breathing gas to the user on demand through an opening 261 therein.

The mask 210 further includes a display apparatus 270 coupled to the facepiece 250, the display apparatus 270 in communication with the camera 248, for example, through a wired or wireless connection, as will be described in further detail below. As shown, the display apparatus 270 includes a main body 272 and an eye piece 277. In exemplary embodiments, the eye piece 277 includes a PCB (not shown) that operates an optic 287 and a display 288 (FIG. 9C), which are disposed within a cylinder or chamber of the eye piece 277, to provide visual imagery and feedback to the user. In one embodiment, the PCB includes a first data communication system 297. The eye piece 277 may be powered by a single or multiple power sources 290, e.g., one or more batteries (FIG. 10) disposed within the integrated bottom section 246. In exemplary embodiments, the power source 290 is disposed exterior to the lens 224 and the facepiece 250.

Similar to above, the camera 248 may be a thermal imaging camera coupled to an exterior of the face blank 212 and the lens 224. In other embodiments, the camera 248 may be positioned external or remote from the lens 224 and the face blank 212. For example, the camera 248 may be attached to a helmet, chest harness, or belt worn by a user. It will be appreciated that embodiments herein are not limited to one particular camera location or camera type.

The camera 248 may be gimbaled and zoom-able via electronic controls, and can also contain a combination of a zoom-able camera as well as a fish eye lens camera, or be a catadioptric mirror camera or other suitable camera system such as infrared or ultraviolet or any combination. It will be appreciated that multiple cameras and/or microphones may be used as part of a heads up display (HUD) or in mask display (IMD). Furthermore, other camera types may be used, and the disclosure is not limited to the geometry or camera type.

Figure 11:
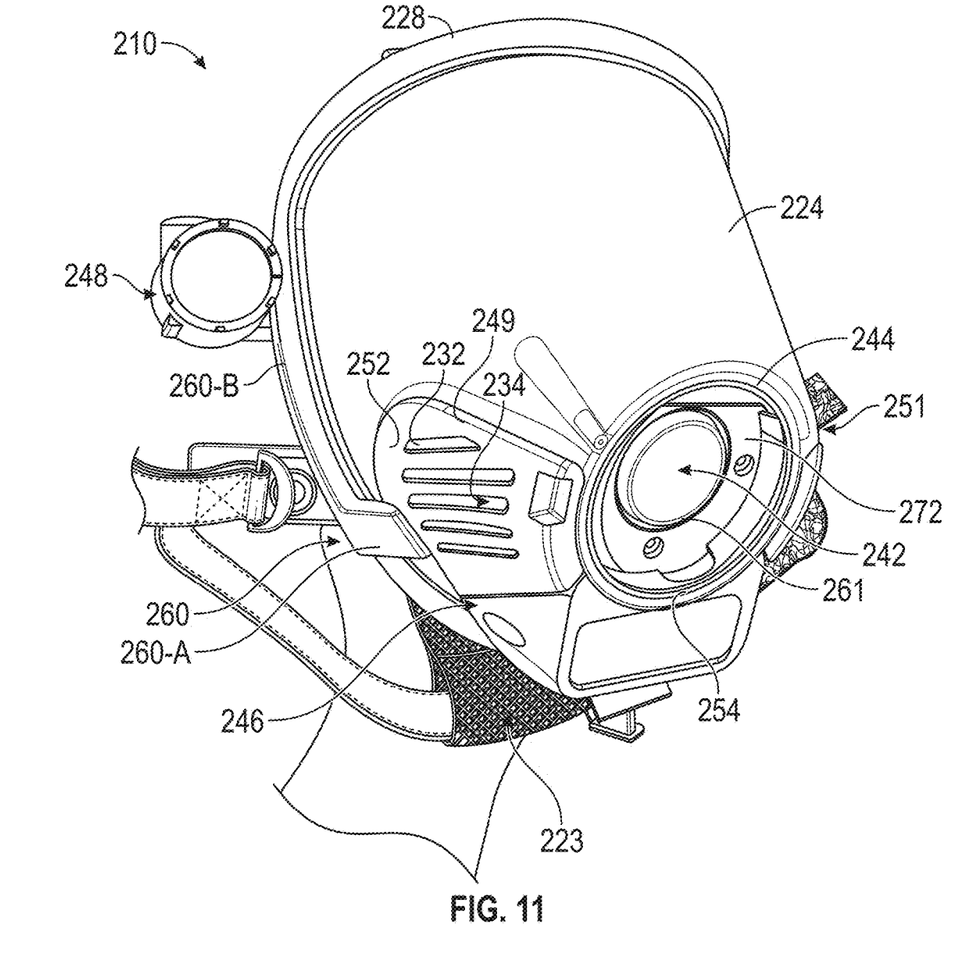
FIG. 11 depict views of an exemplary mask including a lower section according to aspects of the disclosure.

In exemplary embodiments, the camera 248 does not include an internal power source e.g., one or more batteries and, instead, communicates with the power source 290 within the integrated bottom section 246 to receive power therefrom. Alternatively, the camera 248 receives power from an external source, such as a second stage regulator or air purification system (not shown). In one embodiment, as shown in FIG. 11, the camera 248 is electrically coupled to the power source 290 and the first data communication system 297 via a set of wires extending through a conduit 260. The conduit 260, which may be insulated, includes a first section 260-A extending from the outer edge 252 of the bottom section 246, and a second section 260-B extending upwards along the sealing member 228 to the camera 248.

In exemplary embodiments, the camera 248 also communicates visual data to the display 288 via the wiring of the conduit 260. For example, a PCB stack (not shown) of the camera 248 may include a second data communication system 313 operable with the first data communication system 297 of the PCB of the eye piece 277. For example, in an exemplary embodiment, thermal imaging visual data received via the camera 248 is processed by the second data communication system 313 and wirelessly transmitted to the first data communication system 297. The camera 48 may include or integrate an ultrasonic transceiver to provide additional computer generated imaging that may be transmitted to the first data communication system 297 and displayed as an ultrasonic image. The camera 248 may capture environmental information such as IR, visible or low light images, ultrasonic images of the environment encountered by the user and send to the first data communication system 297 either in compressed or uncompressed form.

Furthermore, the first data communication system 297 may receive data from various components including, but not limited to, a pressure transducer in fluid connection with breathing gas tank (not shown), a PASS device, the power source 290, a telemetry system in communicative connection with the user and/or any communication system in a wired or wireless manner as known in the communication arts. The first data communication system 297 communicates the data received from the components, and generates a visual output that is displayed to the user via the display 288, non-limiting examples of which are demonstrated by exemplary display outputs 120A-I of FIG. 8.

It will be appreciated that one or both of first data communication system (97, 297) and second data communication system (113, 313) described herein may include a microcontroller, computer system, computing device, or the like. This may include system/server, which is operational with numerous other general purpose or special purpose computing system environments or configurations. Examples of well-known computing systems, environments, and/or configurations that may be suitable for use with computer system/server may include personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server may be described in the general context of computer system executable instructions, such as program modules, being executed by a computer system. Generally, program modules may include routines, programs, objects, components, logic, data structures, and so on that perform particular tasks or implement particular abstract data types. The computer system/server may be practiced in distributed cloud computing environments where tasks are performed by remote processing devices that are linked through a communications network. In a distributed cloud computing environment, program modules may be located in both local and remote computer system storage media including memory storage devices.

In one embodiment, the computer system/server is in the form of a general-purpose computing device. The components of computer system/server may include one or more processors or processing units, a system memory, and a bus that couples various system components including the system memory to the processor. The bus represents one or more of any of several types of bus structures, including a memory bus or memory controller, a peripheral bus, an accelerated graphics port, and a processor or local bus using any of a variety of bus architectures. Such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server typically includes a variety of computer system readable media. Such media may be any available media that is accessible by the computer system/server, and it includes both volatile and non-volatile media, removable and non-removable media.

System memory may include computer system readable media in the form of volatile memory, such as random access memory (RAM) and/or cache memory. The computer system/server may further include other removable/non-removable, volatile/non-volatile computer system storage media. By way of example only, a storage system may be provided for reading from and writing to a non-removable, non-volatile magnetic media (not shown and typically called a "hard drive"). Although not shown, a magnetic disk drive for reading from and writing to a removable, non-volatile optical disk such as a CD-ROM, DVD-ROM or other optical media may be provided. In such instances, each may be connected to the bus by one or more data media interfaces. As will be further depicted and described below, the memory may include at least one program product having a set (e.g., at least one) of program modules that are configured to carry out the functions of embodiments of the invention.

Program/utility, having a set (at least one) of program modules, may be stored in memory, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system/server may also communicate with one or more external devices that enable a user to interact with the camera and/or display. Such communication can occur via Input/Output (I/O) interfaces. Still yet, the computer system/server can communicate with one or more networks such as a local area network (LAN), a cloud based network, a general wide area network (WAN), and/or a public network (e.g., the Internet) via network adapter.

Based on the foregoing, it will be readily understood by those persons skilled in the art that the disclosure is susceptible of broad utility and application. Many embodiments and adaptations of the disclosure other than those specifically described herein, as well as many variations, modifications, and equivalent arrangements, will be apparent from or reasonably suggested by the present disclosure and the foregoing descriptions thereof, without departing from the substance or scope of the present disclosure. Accordingly, while the disclosure has been described herein in detail in relation to its preferred embodiment, it is to be understood that this disclosure is only illustrative and exemplary of the present disclosure and is made merely for the purpose of providing a full and enabling disclosure of the disclosure. The foregoing disclosure is not intended to be construed to limit the disclosure or otherwise exclude any such other embodiments, adaptations, variations, modifications or equivalent arrangements; the disclosure being limited only by the claims appended hereto and the equivalents thereof. Although specific terms are employed herein, they are used in a generic and descriptive sense only and not for the purpose of limitation.

What is claimed is:

1. An apparatus comprising:
    a facepiece disposed within an interior of a mask;
    a lens coupled to a face blank, the lens covering the facepiece;
    a feedback system disposed between the lens and the facepiece, the feedback system including:
        a display apparatus coupled to the facepiece, the display apparatus comprising:
            a chassis coupled to a chassis cover, the chassis including a flange partially encircling a retaining flange of the facepiece; and
            an eye piece pivotably coupled to the chassis, the eye piece housing an optic and a display; and
        a power source coupled to the display apparatus, the power source electrically connected to the display apparatus for supplying power to the display apparatus; and
    a recording device positioned external to the lens, the recording device operable to communicate data with the display apparatus.

2. The apparatus according to claim 1, further comprising a second power source disposed within a main housing of the recording device, the second power source supplying power to the recording device.

3. The apparatus of claim 1, further comprising an adjustment aperture formed through the chassis to permit external adjustment of the eye piece by a tool inserted through the adjustment aperture.

4. The apparatus of claim 1, wherein the retaining flange is disposed at a distal end of the facepiece, and wherein the retaining flange includes:
    an opening;
    an interior shelf surrounding the opening; and
    a rim extending from the interior shelf.

5. The apparatus of claim 1, further comprising:
    a first data communication system disposed within the display apparatus; and
    a second data communication system of the recording device, the second data communication system in wireless communication with the first data communication system.

6. The apparatus of claim 5, wherein the first data communication system is coupled to a printed circuit board positioned within the eye piece of the display apparatus, and wherein the second data communication system is coupled to a printed circuit board positioned within the main housing.

7. The apparatus according to claim 1, further comprising a lower section extending from a distal end of the lens, wherein the power source is disposed between the lower section and the facepiece.

8. The apparatus according to claim 7, the lower section comprising:
    an upper edge coupled to the lens;
    an outer edge coupled to a sealing member surrounding the lens; and
    an opening disposed between the upper edge and the outer edge, wherein the opening of the lower section is aligned with a central opening of the lens and an opening of the display apparatus.

9. The apparatus according to claim 1, further comprising a conduit for supplying power from the power source to the recording device.

10. An in-mask feedback system, comprising:
    a facepiece disposed within an interior of a mask;
    a lens coupled to a face blank, the lens covering the facepiece;
    a feedback system disposed between the lens and the facepiece, the feedback system including:
        a display apparatus coupled to the facepiece, the display apparatus including a first data communication system, the display apparatus comprising:
            a chassis coupled to a chassis cover, the chassis including an arcuate flange partially encircling a retaining flange of the facepiece; and
            an eye piece pivotably coupled to the chassis, the eye piece housing an optic and a display; and
        a power source coupled to the display apparatus, the power source electrically connected to the display apparatus for supplying power to the display apparatus;
    a feedback device external to the lens and the face blank, the feedback device including a camera and a second data communication system operable to wirelessly communicate data to the display apparatus.

11. The in-mask feedback system according to claim 10, further comprising a second power source disposed within a main housing of the feedback device, the second power source supplying power to the feedback device.

12. The in-mask feedback system of claim 10, further comprising an adjustment aperture formed through the chassis to permit external adjustment of the eye piece by a tool inserted through the adjustment aperture.

13. The in-mask feedback system of claim 10, wherein the retaining flange is disposed at a distal end of the facepiece, and wherein the retaining flange includes:
   an opening;
   an interior shelf surrounding the opening; and
   a rim extending from the interior shelf.

14. The in-mask feedback system of claim 10, wherein the first data communication system is coupled to a printed circuit board positioned within the eye piece of the display apparatus, and wherein the second data communication system is coupled to a printed circuit board positioned within the main housing of the feedback device.

15. The in-mask feedback system according to claim 10, further comprising a lower section extending from a distal end of the lens, wherein the power source is disposed between the lower section and the facepiece.

16. The in-mask feedback system according to claim 15, the lower section comprising:
   an upper edge coupled to the lens;
   an outer edge coupled to a sealing member surrounding the lens; and
   an opening disposed between the upper edge and the outer edge, wherein the opening of the lower section is aligned with a central opening of the lens and an opening of the display apparatus.

17. The in-mask feedback system according to claim 16, further comprising a conduit for supplying power from the power source to the feedback device, the conduit comprising:
   a first section extending from the outer edge of the lower section; and
   a second section connecting the first section to the feedback device, the second section extending upwards along the face blank.

18. A mask, comprising:
   a facepiece configured to encompass a nose and a mouth of a wearer;
   a face blank extending around the facepiece;
   a lens coupled to the face blank, the lens extending over the facepiece;
   an in-mask feedback system disposed between the lens and the facepiece, the in-mask feedback system including:
      a display apparatus coupled to the facepiece, the display apparatus including a first data communication system; and
      a power source coupled to the display apparatus, the power source being electrically connected to the display apparatus for supplying power to the display apparatus, and the power source being disposed between a distal end of the lens and the facepiece; and
   a feedback device coupled to the face blank, external to the lens, the feedback device including a camera and a second communication system operable to wirelessly communicate data with the display apparatus.

\* \* \* \* \*